(12) United States Patent
Shi

(10) Patent No.: US 9,171,579 B2
(45) Date of Patent: Oct. 27, 2015

(54) METHOD AND APPARATUS FOR EDITING A PROGRAM ON AN OPTICAL DISC

(71) Applicant: KONINKLIJKE PHILIPS N.V., Eindhoven (NL)

(72) Inventor: Jun Shi, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/264,614

(22) Filed: Apr. 29, 2014

(65) Prior Publication Data

US 2014/0233920 A1 Aug. 21, 2014

Related U.S. Application Data

(63) Continuation of application No. 12/092,827, filed as application No. PCT/IB2006/054075 on Nov. 3, 2006, now Pat. No. 8,712,224.

(30) Foreign Application Priority Data

Nov. 7, 2005 (CN) .......................... 2005 1 0120156

(51) Int. Cl.
*G11B 27/034* (2006.01)
*G11B 27/036* (2006.01)
(Continued)

(52) U.S. Cl.
CPC ............ *G11B 27/034* (2013.01); *G11B 27/036* (2013.01); *G11B 27/105* (2013.01); *G11B 27/3027* (2013.01); *G11B 2220/216* (2013.01); *G11B 2220/2545* (2013.01)

(58) Field of Classification Search
USPC .......................................................... 386/52
See application file for complete search history.

(56) References Cited

U.S. PATENT DOCUMENTS 5,057,932 A * 10/1991 Lang .............................. 386/314
5,930,446 A * 7/1999 Kanda ........................... 386/282
(Continued)

FOREIGN PATENT DOCUMENTS

EP 0940982 A2 9/1999
EP 1538625 A2 6/2005
(Continued)

OTHER PUBLICATIONS

International Search Report of International Application No. PCT/IB2006/054075 Contained in International Publication No. WO2007052232.

(Continued)

*Primary Examiner* — Andy Rao
*Assistant Examiner* — Ali Shayanfar

(57) ABSTRACT

The present invention provides a method and apparatus for editing a program on a re-writable compact disc. The method comprises the steps of acquiring the description information of two program segments of said program, said program segments being in sequence in playing-back order, said description information comprising the ending description information of the previous program segment and the start point information of the subsequent program segment, generating a guiding information to guide the ending point information to the start point information according to the description information and playing-back order of said program segments and updating the description information of said program according to said guiding information. With this invention, excessively detailed application editing work and an expense of high buffering cost may be avoided in editing compact disc program.

23 Claims, 4 Drawing Sheets

(51) Int. Cl.
*G11B 27/10* (2006.01)
*G11B 27/30* (2006.01)

(56) References Cited

U.S. PATENT DOCUMENTS

| | | | |
|---|---|---|---|
| 5,995,471 A | 11/1999 | Saoyama et al. | |
| 6,088,304 A * | 7/2000 | Aramaki et al. | 369/30.09 |
| 6,148,140 A * | 11/2000 | Okada et al. | 386/241 |
| 6,181,870 B1 * | 1/2001 | Okada et al. | 386/241 |
| 6,415,095 B1 * | 7/2002 | Morishima et al. | 386/281 |
| 6,640,044 B2 | 10/2003 | Greenwood et al. | |
| 2002/0135607 A1 | 9/2002 | Kato et al. | |
| 2003/0052910 A1 | 3/2003 | Shiiyama | |
| 2005/0050062 A1 * | 3/2005 | Hanes et al. | 707/100 |

FOREIGN PATENT DOCUMENTS

| | | |
|---|---|---|
| JP | 10106237 A | 4/1998 |
| WO | 2004053875 A2 | 6/2004 |

OTHER PUBLICATIONS

Written Opinion of the International Searching Authority for International Application No. PCT/IB2006/054075.

* cited by examiner

METHOD AND APPARATUS FOR EDITING A PROGRAM ON AN OPTICAL DISC

CLAIM OF PRIORITY

This applicant claims, as a Continuation Application pursuant to 35 USC 120, priority to, and the benefit of, the earlier filing date of that patent application entitled "Method And Apparatus For Editing A Program On An Optical Disc," filed in the US Patent and Trademark Office on May 7, 2008, and afforded Ser. No. 12/092,827, which claimed priority as a National Stage Entry of that patent application filed on Nov. 3, 2006 and afforded serial number PCT/IB2006/054075, which claimed priority to that patent application filed in the Chinese Patent Office on Jul. 11, 2005 and afforded serial number 200510120156.4, the contents of all of which are incorporated herein by reference herein.

FIELD OF THE INVENTION

The present invention relates to the technical field of optical storage, in particular to a method and apparatus for editing a program on an optical disc.

BACKGROUND OF THE INVENTION

In the field of digital programs, the editing of program contents is always accompanied by editing the integral structure of the program. The editing of the program structure always leads into a plurality of program segments divided due to content editing (for example, deletion or addition, etc.) as independent programs, or buffering the plurality of program segments and re-allocating resources and thereby integrally store them as one file. These technical solutions are relatively adaptable to edit simple audio/video stream programs, but are hardly adaptable to-complex audio/video stream programs in the optical storage field.

In the optical storage field, with the increasing enhancement of playing back functions of optical disc, in particular interactive functions, a program data stream and the corresponding application are getting more complex. The application and program data stream closely correspond to each other, wherein the complex calling relation and interacting relation of the program contents are always included, therefore, the editing of program contents and structure will be accompanied by the editing of complex applications. If processing each program segment as an independent program, the editing of the relevant application will become very complex, for the reason that the objects processed by the application has been changed from a single program to multiple programs.

Sometimes, it is quite possible that the modification of the application cannot be carried out. In order to adapt to different consumers' requirements, the optical disc format provides the optical disc writing and playing functions in different function layers. A higher function layer supplies the user with powerful navigation functions such as various menu and interaction, whereas a lower function layer provides conventional navigation functions like a relatively simple menu.

For example, a low function optical disc writing means may delete a segment of program content recorded on a high function re-writable optical disc, at the same time correspondingly edit the application on a low function layer, however, it cannot modify the application on the high function layer for failure to identify the information on the higher function layer. If using a high function optical disc playing means to play back the optical disc again, the application will continue to call that segment of program content having been deleted, because the application on the high function layer is not edited correspondingly, then inevitably an error of playing back is generated.

In addition, the optical disc programs usually have a relatively large amount of data, if various program segments are buffered and integrated into a complete file and stored on the optical disc, it will need a very big buffering space and has a very critical requirement for the buffering means, so the cost is quite high.

Therefore, it needs to provide a method and apparatus for editing optical disc programs to edit the programs on a re-writable optical disc, thereby avoiding not only the employment of the buffering means of high cost and complex editing of the relevant application, but also the conflict in playing between the program and application due to different function layers.

OBJECT AND SUMMARY OF THE INVENTION

The object of the invention is to provide a method and apparatus for editing optical disc programs so as to overcoming the disadvantages in the prior art.

According to an embodiment of this invention, a method for editing a program on a re-writable optical disc, the method comprising the steps of: acquiring the description information of two program segments of said program, said program segments being in sequence in playing-back order, said description information comprising the ending point information of the previous program segment and the start point information of the subsequent program segment, generating a guiding information to guide the ending point information to the start point information according to the description information and playing-back order of said program segments and updating the description information of said program according to said guiding information.

Said program segment may be a program part that is formed during editing the content of said program, and it is independent of other parts of the program. For example, a newly added program part or a remaining program segments after deletion, etc. Said starting point information and ending point information may be the time information, or the address information respectively of both ends.

According to an embodiment of the invention, an apparatus for editing a program on a re-writable optical disc is provided, the apparatus comprising of acquiring means for acquiring the description information of two program segments of said program, said program segments being in sequence in playing-back order, said description information comprising the ending point information of the previous program segment and the start point information of the subsequent program segment, generating means for generating a guiding information to guide the ending point information to the start point information according to the description information and playing-back order of said program segments and updating means for updating the description information of said program according to said guiding information.

With the method and apparatus for editing optical disc programs provided in the present invention, when the content of a program is edited, it is not necessary to edit the relevant application. No matter whether the applications and the program editing operation are in the same function layer, it is not necessary to perform integration and buffering of the edited program, therefore excessively detailed application editing work and an expense of high buffering cost may be avoided.

Through the following description of the invention made with reference to the drawings as appended and the claims, the object and achievements of the invention will become obvious, and a comprehensive understanding of the invention will be obtained.

BRIEF DESCRIPTION OF THE DRAWINGS

The invention will be explained in detail with reference to the appended drawings through specific embodiments.

FIG. 4-1 is a schematic diagram illustrating the first case of calling a program edited according to the invention;

FIG. 4-2 is a schematic diagram illustrating the second case of calling a program edited according to the invention;

FIG. 4-3 is a schematic diagram illustrating the third case of calling a program edited according to the invention;

FIG. 4-4 is a schematic diagram illustrating the fourth case of calling a program edited according to the invention.

In the above drawings, the same reference signs represent the same, similar, or corresponding features or functions.

DETAILED DESCRIPTION OF THE INVENTION

Figure 1:
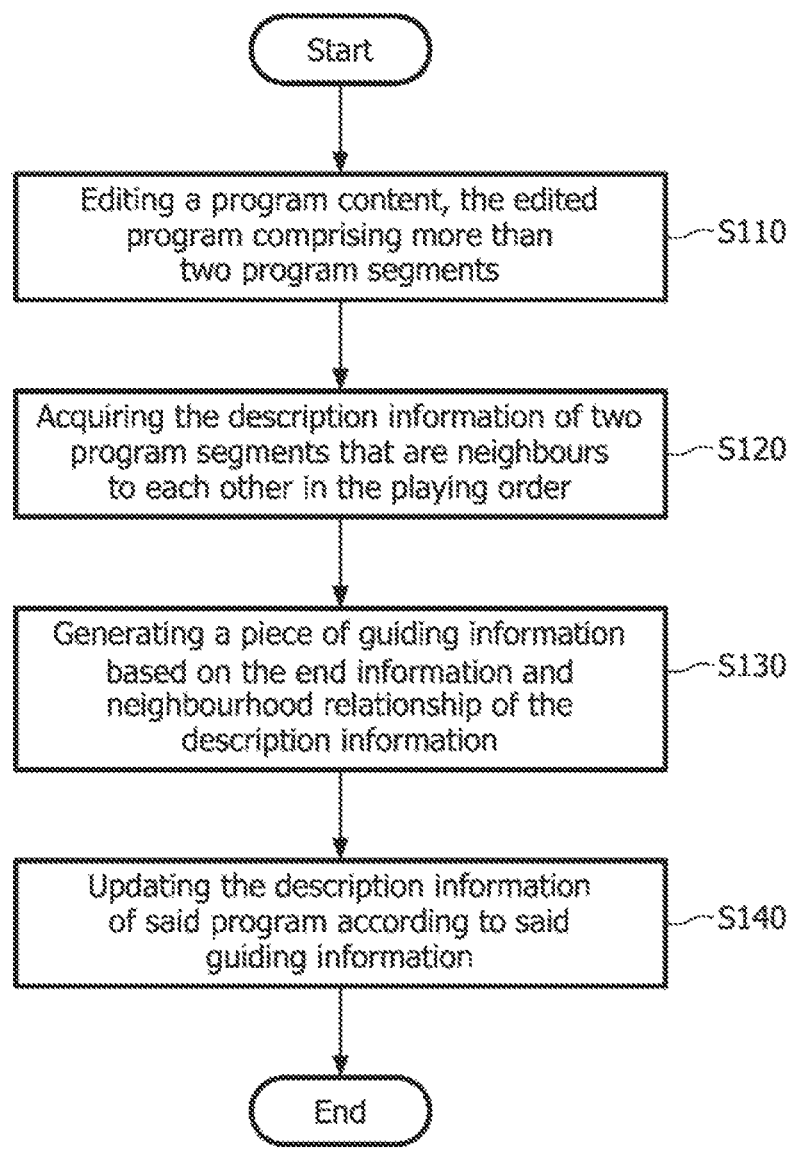
FIG. 1 is a flow chart of the method for editing optical disc programs according to an embodiment of the invention.

FIG. 1 is a flow chart of the method for editing optical disc programs according to an embodiment of the invention. Initially, editing the content of a program on the optical disc, and the edited program comprises more than two program segments after the edition (step S 110). The editing of the program comprises such operations as deleting, adding and modifying parts of the program. Said editing divides the program into two or more program segments.

For example, the content of a piece of program segment is added to a certain middle position of the program, and the edited program includes three program segments. They are the newly added program segment, the program part before this new segment and the program content after this new segment. Another example, since a segment of program is deleted from a certain middle position of the program, the edited program comprises two program segments, that is, the program segment before the deleted content, and the program segment after the deleted content. More than two program segments will be created if deleting or adding a plurality of program segments.

In particular, the content editing of the program may further include the deletion or substitute of the whole program. If the whole program is deleted, it may be deemed that the original program is divided into two segments. In the first segment, the address of the start point is identical to the address of the ending point and is also the same as the address of the start point of the original program. In the second segment, the address of the start point is identical to the address of the ending point and is also the same as the address of the ending point of the original program.

Secondly, the description information of two program segments of said program are acquired, said program segments being in sequence in playing-back order, said description information comprising the ending point information of the previous program segment and the start point information of the subsequent program segment (step S120). Said program segments are program contents that are formed due to content editing and are independent to other parts of the program, for example, a newly added segment of program content, etc.

Even as every program, each program segment has its corresponding description information, for example, the time length of playing-back, the time to start playing, the time to finish playing, the start and ending address, etc. The start time or address is the start point information of the program segment, and the ending time or address is the ending point information of the program segment. Said description information may be used to identify the program segment.

Then, according to the acquired information of the both starting and ending points of the program segment and playing-back order of said program segments, a piece of guiding information is generated to guide the ending point information of a program segment to the start point information of another program segment (Step S130). According to the sequence relationship, the end of a program segment is just a start of another program segment, so the guiding information establishes guiding relation between the ending point information of the previous program segment and the start point information of the subsequent program segment. When the playing of a program comes to the ending point of the previous program segment, according to the guide of the guiding information, the optical disc playing apparatus may continue to play the program from the start point of the subsequent program segment.

In the case that the whole program is deleted, the guiding information may guide the start point information of the original program directly to its ending point information.

Finally, according to said guiding information, the description information of said program is updated (Step S140). According to the invention, the editing of the program on the optical disc is only limited to updating the content, structure and description information of the program, it does not involve editing of the application related to the playing-back of the program, so it needs to update the original description information of the program, which not only guarantees that the application calls the programs normally, but also ensures the editing of the program content may work.

The description information is updated according to the generated guiding information of program segments. The updating includes generating the sequence connection between respective program segments, such as the guiding information of the end information, etc.

Said updating may further include generating guiding information of time or address information between the start point information and the ending point information. For example, if the start address of the called part is in the middle of the deleted program segment, the description information will guide the corresponding application to perform the calling operation from another address.

Through the method for editing optical disc programs provided by the invention, the updating of the description information does not alter the external structure of the program, so it has no impact on the calling of the program by the application, and it does not need to edit the application or consider whether the application and the editing operation are at the same function layer, thereby excessively detailed application editing work and an expense of high buffer cost may be avoided.

Figure 2:
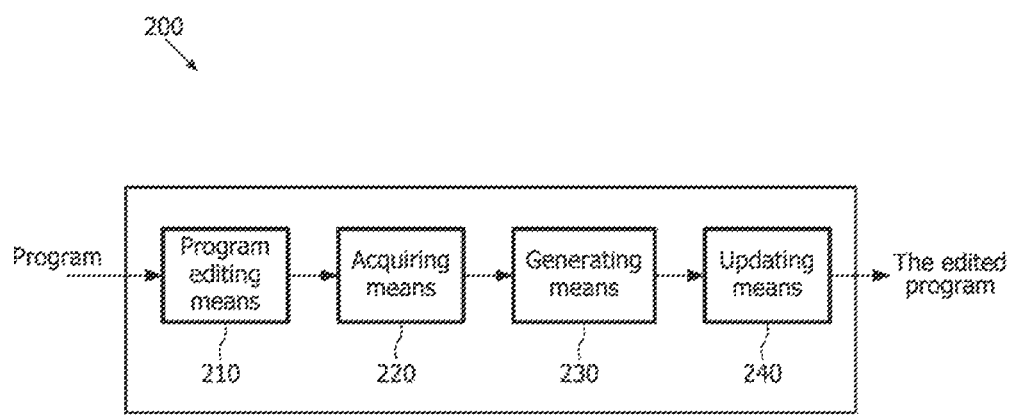
FIG. 2 is a block diagram of an optical disc editing apparatus according to an embodiment of the invention.

FIG. 2 is a block diagram of an optical disc editing apparatus according to an embodiment of the invention. The apparatus 200 comprises an acquiring means 220 for acquiring the description information of two program segments of said program, said program segments being in sequence in playing-back order, said description information comprising the ending point information of the previous program segment and the start point information of the subsequent program segment.

Apparatus 200 also comprises a generating means 230 for generating a guiding information to guide the ending point information to the start point information according to the description information and playing-back order of said program segments, and the guiding information is used to guide said ending point information to said start point information. According to the playing order, an end of a program segment is just a start of another program segment, so the guiding information establishes a guiding relationship between the ending point information of the previous program segment and the start point information of the subsequent program segment. When the playing of a program comes to the ending point of the previous program segment, following the guiding information, the optical disc playing apparatus may continuously play the program from the start point of the subsequent program segment.

Apparatus 200 also includes an update means 240 for updating the description information of said program according to said guiding information. The update of description information comprises establishing the sequential connection between respective program segments, for example, the guiding information of end information, etc. It may further comprise generating guiding information for time or address information between the ending point information and start point information. For example, if the start point address r0 of the called part R is in the middle of a deleted part, the description information may guide said r0 address through guiding information to a start point address of a program segment immediately following the deleted part.

Apparatus 200 may also comprise a program editing means 210 for editing the program content. The editing of program content causes the program content to become more than two program segments that are relatively independent.

Through the optical disc program editing apparatus provided by the invention, the updating of the description information does not alter the external structure of the program, so it has no impact on the calling of the program by the application, and it does not need to edit the application or consider whether the application and the editing operation are at the same function layer, thereby excessively detailed application editing work and an expense of high buffer cost may be avoided.

Figure 3:
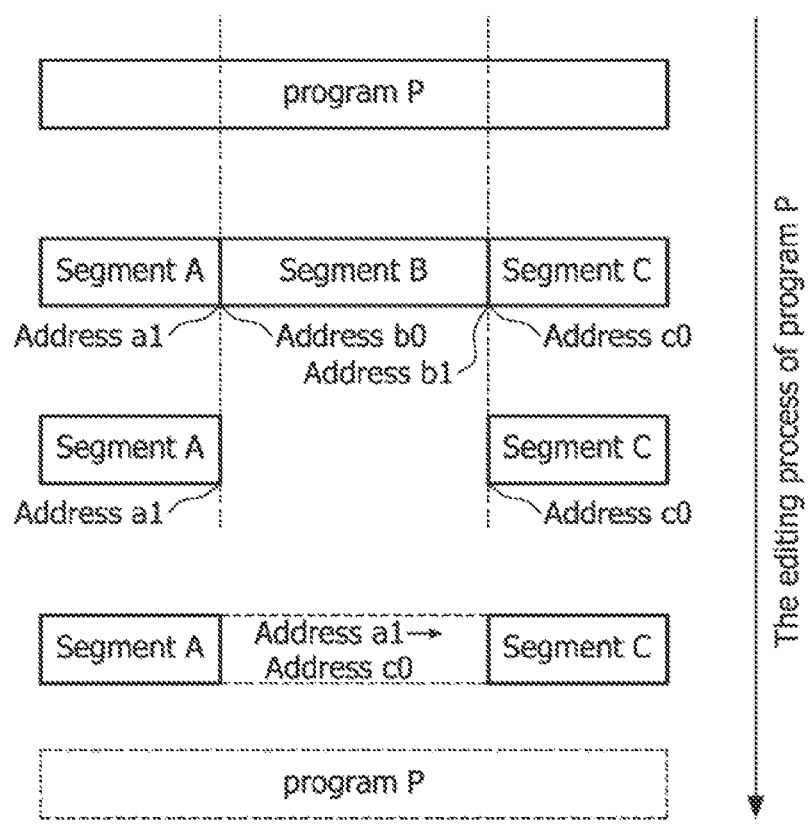
FIG. 3 is a schematic diagram illustrating the process to edit a program according to the invention.

FIG. 3 is a schematic diagram illustrating the process to edit a program according to the invention. Program P is a program stored on a re-writable optical disc. An editor (e.g. the user) deletes the program segment B from program P, so that the program P is divided into inconsecutive segment A and segment C. The address of program segment B is from address b0 to address b1 wherein address b0 is immediately forward adjacent to the ending point address a1 of the program segment A, and address b1 is immediately backward adjacent to the start point address c0 of the program segment C.

According to the prior art, the program segments A and C maybe processed respectively as independent programs. Such solution needs a complex editing of the related application. If the application is not in the function layer at which program editing is performed, the application cannot be edited correspondingly. According to the prior art, the program segments A and C may also be stored in a huge buffer, after being integrally edited as a complete consecutive file, they are then stored on an optical disc. This solution needs a buffer of high cost.

According to the invention, a piece of guiding information is generated with regard to program segments A and C, the guiding information is schematically represented as follows: address a1→address c0. When playing the optical disc, the guiding information guides the optical disc playing means from the ending point of program segment A to the start point of program segment C, so that the program is played consecutively. As shown by program P in the dashed block of FIG. 3, the description information of the updated program P keeps program P still as a complete consecutive program in form.

Below is an example of updating the description information of a program.

```
zzzzz.clipi {
clip type; //Virtual or Real
if(clip_type=Real)
{
       Use the clip information for real clip;
}
if(clip_type=Virtual)
{
       Num_Info_Slot; //the number of Clipinfo slots, bridge plus real
       info
       For (i=0; i<Num Info Slot; i++)
       {
       Info type; //Real or Bridge
       if(-Info type = Real)
       {
       Starttime; //the start time/position of this clip in original timeline
       Endtime; ////the end time/position of this clip in original timeline
       clipinfo file name; //aaaaa.clipi
       }
       else    //For Info Bridge
       {
       Endtime_previous; //the end time/position of previous clip in
                        //original timeline
       Starttime_next; //the start time/position of next clip in original
                        //timeline
       Clipinfo_file_name_previous; //aaaaa.clipi
       Clipinfo_file_name_next; //bbbbb.clipi
       }
  }
 }
}
```

In this example, clipi is a program stored on a re-writable optical disc. If the program is never edited, the optical disc playing apparatus plays the program according to the description information of clipi (Use the clip information for real clip).

If the program clipi has been edited to thereby include more than two program segments, then the clipi is called as virtual clip in this example, it needs to update the description information when playing the program. The updated description information comprises guiding information Info Bridge. The info bridge is the guiding information generated according to the invention, wherein the info Bridge includes the ending point information of a previous program segment and the start point information of a subsequent program segment, and the information of correspondingly guiding a ending point to a start point. In this example, the end information used by the program segments is time information.

The guide of address or time information of a called program part maybe realized by updating the description information of a program. The updating is carried out in a manner of guiding, according to the guiding information, the address or time information between the ending point and start point to the ending point or start point.

Figures 1, 4:
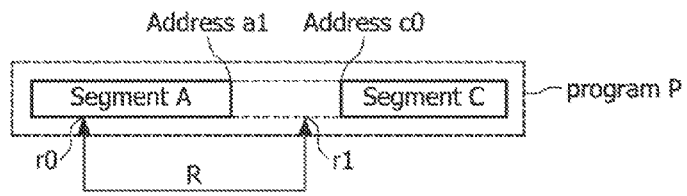
Figures 2, 4:
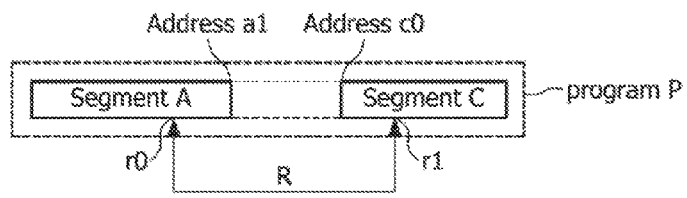
Figures 3, 4:
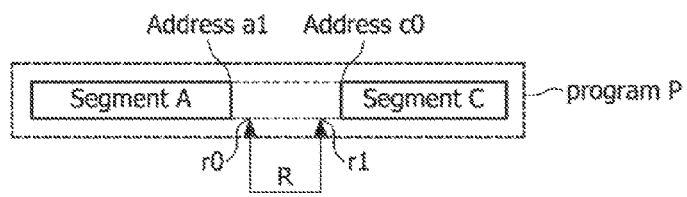
Figure 4:
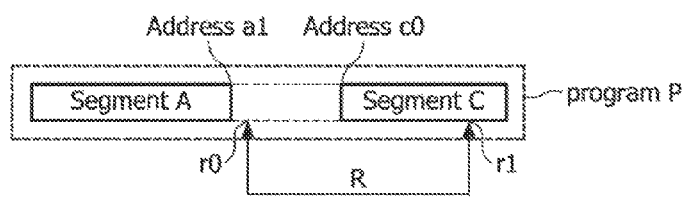

According to the design of the optical disc playing function, the application may call a whole program or part of the contents of the program. FIGS. 4-1 to 4-4 are schematic diagrams showing four cases of an application calling partial content R of program P. After a part of program is deleted, program P comprises two segments A and C.

Corresponding to program segments A and C, the description information of program P includes a piece of guiding information: address a1→address c0, and further comprises the guiding information of the address of the called program part.

In FIGS. 4-1 to 4-4, R is a program part that needs to be called by the application, r0 and r1 are the start point information and ending point information of R respectively, they maybe address information or time information. Below the description is made taking address information as an example.

FIG. 4-1 is a schematic diagram illustrating the first case. The start point address r0 of the calling part R is before the address a1, the ending point address is between the addresses a1 and c0. According to the description information of program P and the relative positions of r0 and r1 and a1 and c0, address r1 equals to address a1, i.e. the description information will guide the application to actually call the part of program content from address r0 to a1. Through the description information updated according to guiding information, the application does not need any modification, in the meanwhile, this avoids an error playing between address a1 to r1.

FIG. 4-2 is a schematic diagram illustrating the second case. The start point address r0 of the calling part R is before the address a1, the ending point address r1 is after c0. According to the guiding information of program P, the called program content is played from r0 to a1, and is directly guided to address c0 for continuous playing, thereby avoiding an error playing between a1 to c0.

FIG. 4-3 is a schematic diagram illustrating the third case. The start point address r0 and the ending point address r1 of the calling part R are between address a1 and c0. According to the guiding information of program P, the called program content is empty, represented as address r0=r1. In this case, the optical disc playing apparatus may directly perform the following playing procedure, give a hint to the user that the called part has been deleted, or give further hint to the user about whether the corresponding application shall be deleted.

FIG. 4-4 is a schematic diagram illustrating the fourth case. The start point address r0 of the calling part R is between address a1 and address c0, and the ending point address is after address c0. According to the guiding information of program P, the address of r0 and the address of r1, address r0 equals to address c0, i.e. the actually called part is the part of program content from address c0 to r1.

Through the method and apparatus for editing optical disc programs provided by the invention, when editing the content of a program, it does not need to edit the relevant applications, no matter whether the applications and the program editing operation are in the same function layer, and it does not need to perform integration and buffering of the edited program, thereby avoiding excessively detailed application editing work and an expense of high buffering cost.

Although the invention is described in combination with preferred embodiments, apparently various replacements, modifications and changes made by those skilled in the art according to the contents described above will be obvious. Therefore, all of such replacements, modifications and changes shall come within the spirit and scope of the claims of the invention.

The invention claimed is:

1. An audio/video program editing apparatus for editing an audio/video program on a re-writable optical disc, comprising:
    an acquiring device configured for acquiring:
        description information of two program segments of the audio/video program, the description information comprising starting point information and ending point information of each of the program segments, wherein a second program segment is subsequent to a first program segment in a playback order; and
        description information associated with the audio/video program, the description information comprising a start point information and an end point information;
    a generating device configured for generating guiding information between the first and second program segments according to the description information of the audio/video program, wherein the guiding information comprising a bridge between first program segment and the second program segment, wherein the bridge includes the start point information selected between the first program segment starting point information and the second program starting point information, wherein the start point information is selected as the second program segment starting point when the audio/video program start point is between the first program segment end point and the second program segment starting point and the end point information selected between the ending point information of the first program segment and the ending point information of the second program segment;
    an updating device configured for updating the descriptive information associated with the audio/video program with the generated guiding information; and
    a storing device configured for storing the updated guiding information to the rewritable optical disc.

2. The editing apparatus of claim 1, wherein the guiding information is generated with regard to the ending point information of the first program segment and the starting point information of the second program segment.

3. The editing apparatus of claim 1, wherein each of the start point and the end point of the audio/video program is a time.

4. The editing apparatus of claim 1, wherein each of the starting point information and the ending point information of the two program segments is a time.

5. The editing apparatus of claim 1, wherein the guiding information represents a sequential connection relationship between respective ones of the two program segments.

6. The editing apparatus of claim 1, further comprising:
    a playback apparatus playing the audio/video program based on the descriptive information of the audio/video program.

7. The editing apparatus of claim 1, wherein the guiding information is generated with regard to the end point information of the audio/video program and the starting point information of the second program segment.

8. The editing apparatus of claim 7, wherein the guiding information is generated with regard to the start point information of the audio/video program and the starting point information of the first program segment.

9. The editing apparatus of claim 1, wherein the guiding information comprises:
    the ending point information of the first program segment when the end point of the audio/video program is prior to the starting point information of the second program segment.

10. The editing apparatus of claim 1, wherein each of the start point and the end point of the audio/video program is represented as an address.

11. The editing apparatus of claim 1, wherein each of the starting point information and the ending point information of the program segments is an address.

12. A method, operable in an audio/video programming editing apparatus for editing an audio/video program on a re-writable optical disc, the method comprising:

acquiring
description information of two program segments of the audio/video program, the description information comprising starting point information and ending point information of each of the program segments, wherein a second program segment is subsequent to a first program segment in a playback order; and
acquiring description information associated with the audio/video program, the description information comprising a start point information and end point information;
generating guiding information between the first and second program segments according to the description information of the audio/video program, wherein the guiding information comprises the start point information selected from the first program segment starting point information to the second program starting point information and the end point information selected between the end point information of the first program segment, wherein the start point information is selected as the second program starting point when the audio/video program start point is between the first program segment end point and the second program segment starting point and the ending point information of the second program segment;
updating the descriptive information associated with the audio/video program with the generated guiding information; and
storing the updated descriptive information associated with the audio/video program to the rewritable optical disc.

13. The method of claim 12, wherein the guiding information is generated with regard to the ending point information of the first program segment and the starting point information of the second program segment.

14. The method of claim 12, wherein each of the start point and the end point of the audio/video program is a time.

15. The method of claim 12, wherein each of the starting point information and the ending point information of the two program segments is a time.

16. The method of claim 12, wherein the guiding information represents a sequential connection relationship between respective ones of the two program segments.

17. The method of claim 12, further comprising:
playing the audio/video program based on the descriptive information of the audio/video program.

18. The method of claim 12, wherein the guiding information is generated with regard to the end point information of the audio/video program and the starting point information of the second program segment.

19. The method of claim 18, wherein the guiding information is generated with regard to the start point information of the audio/video program and the starting point of the first program segment.

20. The method of claim 12, wherein the guiding information comprises:
the starting point information of the second program segment when the start point information of the audio/visual program is greater than the ending point information of the first program segment and less than the starting point information of the second program segment.

21. The method of claim 12, wherein each of the start point and the end point of the audio/video program is represented as an address.

22. The method of claim 12, wherein each of the starting point information and the ending point information of the program segments is an address.

23. A tangible computer-readable storage-medium that is not a transitory propagating signal or wave, the medium being modified with control information including instructions for performing a method, operable in an audio/video programming editing apparatus for editing an audio/video program on a re-writable optical disc, the method comprising:
acquiring
description information of two program segments of the audio/video program, the description information comprising starting point information and ending point information of each of the program segments, wherein a second program segment is subsequent to a first program segment in a playback order; and
acquiring description information associated with the audio/video program, the description information comprising a start point information and end point information;
generating guiding information between the first and second program segments according to the description information of the audio/video program, the description information of the first program segment and the second program segment, wherein the guiding information comprises the start point information selected between the first program segment starting point information to the second program starting point information, wherein the start point information is selected as the second program starting point when the audio/video program start point is between the first program segment end point and the second program segment starting point and the end point information selected between the end point information of the first program segment and the ending point information of the second program segment and at least one of: the start point of the audio/video program, the end point of the audio/video program and a link between the ending point of the first program segment and the starting point of the second program segment;
updating the descriptive information associated with the audio/video program with the generated guiding information; and
storing the updated descriptive information associated with the audio/video program to the rewritable optical disc.

* * * * *